United States Patent Office 3,084,194
Patented Apr. 2, 1963

3,084,194
PREPARATION OF TROPONES
Arne P. ter Borg, Robert van Helden, and Geertruida M. La Roij, all of Amsterdam, Netherlands, assignors to Shell Oil Company, New York, N.Y., a corporation of Delaware
No Drawing. Filed June 8, 1960, Ser. No. 34,610
Claims priority, application Netherlands July 20, 1959
2 Claims. (Cl. 260—586)

This invention relates to a novel process for the production of tropones and thiotropones. More particularly, it relates to a novel process for the production of tropones and thiotropones by thermally cleaving appropirate ethers and thioethers.

Tropones and thiotropones are intermediary products in the preparation of tropolones and thiotropolones. These final products are compounds possessing biocidal properties, anti-mitotic properties, and are useful as metal deactivators as well as for other purposes.

According to the known syntheses, tropones and thiotropones can only be produced with difficulty and in low yields, one of the reasons being that the special starting compounds required by these syntheses are not readily available. In adidition, these syntheses are generally only suitable for the production of one particular product such as tropone itself.

It has now been found that by heating certain substituted or unsubstituted tropylethers or tropylthioethers, high yields of corresponding substituted and unsubstituted tropones and thiotropones respectively may be obtained.

In its generic aspect, the present invention is best described as a process for the production of tropones and thiotropones which comprises thermally cleaving a member of the group consisting of tropylether, tropylthioether, and any member of this group wherein its tropyl ring is hydrocarbon-substituted. Preferred hydrocarbon substituents are alkyl radicals, aryl radicals, aralkyl radicals, alkaryl radicals, and cycloalkyl radicals, containing no more than 10 carbon atoms.

The reaction involved in this invention may be represented by the following equation:

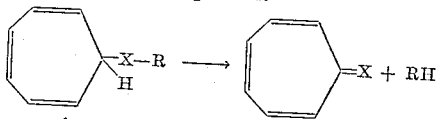

In this equation, X represents an oxygen or sulfur atom and R is a monovalent organic radical. In selecting a suitable ether starting material, it is preferred that ethers are chosen in which R is an alkyl radical, an aryl radical, or a tropyl radical, although other hydrocarbon radicals such as an alkenyl, cycloalkyl, aralkyl, or alkaryl radical are equally suitable. It is also preferred that R contain no more than 12 carbon atoms.

It will be obvious to those skilled in the art that any desired tropone or thiotropone may be obtained by selecting the appropriate starting material. Thus, to prepare any given substituted tropone, it is only necessary to start with a tropylether having its tropyl-ring substituted with the substituent desired on the tropone product.

An illustrative group of suitable starting materials and the tropone or thiotropone obtained is as follows:

Tropyl methyl ether→tropone
Tropyl phenyl ether→tropone
Tropyl 2-methylphenyl ether→tropone
Tropyl β-phenylethyl ether→tropone
Tropyl cyclohexyl ether→tropone
Tropyl allyl ether→tropone
2,3,5-trimethyltropyl methyl ether→2,3,5-trimethyl tropone
3-phenyltropyl ethyl ether→3-phenyl tropone
5-phenylmethyltropyl phenyl ether→5-phenylmethyl tropone
Di(2-methyltropyl) ether→2-methyltropone
Di(2-phenyl-3,4-dimethyltropyl) ether→2-phenyl-3,4-dimethyl tropone
Tropyl methyl thioether→thiotropone
Tropyl 2-methylphenyl thioether→thiotropone
Tropyl cyclohexyl thioether→thiotropone
2,3,5-trimethyltropyl methyl thioether→2,3,5-trimethyl thiotropone
5-phenylmethyltropyl phenyl thioether→5-phenylmethyl thiotropone
Di(2-phenyl-3,4-dimethyltropyl) thioether→2-phenyl-3,4-dimethyl thiotropone The tropyl ethers as starting materials to be used in this invention may be obtained by hydrolysis or alcoholysis of the corresponding tropylium salt. The thioether is obtained from the tropylium salt by conversion with hydrogen suufide or a thiol. Assymetrical ethers and thioethers are obtained by reacting the relevant tropylium salt with an alcohol or thiol while hydrolysis and treatment with hydrogen sulfide provide symmetrical ethers and thioethers respectively.

Particularly advantageous starting materials are the symmetrical ethers. As seen from the equation illustrating the reaction of this invention, a hydrocarbon RH is obtained as a byproduct of the thermal cleavage. When this hydrocarbon is obtained from a tropyl radical it may be recycled and converted to a tropylium salt by oxidation in an acid medium as taught by copending application Serial No. 34,607 filed June 8, 1960. The product tropylium salt is then available for hydrolysis or alcoholysis to an ether suitable as a starting material in this invention. Similarly, symmetrical thioethers yield hydrocarbons suitable for recycling.

The temperature at which the process of this invention is carried out depends upon various factors such as pressure, nature of the particular tropyl ether or tropyl thioether employed as starting material, whether or not any gas stream is used during heating, and the presence of any diluents, acids, or the like. The operating temperature for the thermal cleavage is generally not above 250° C., although higher temperatures may also be used. Temperatures not exceeding 150° C. and preferably in the range from about 60° C. to about 130° C. are particularly suitable.

The reaction may be very suitably carried out at atmospheric pressure. To prevent undesirable decompositions and side reactions, it has, however, been found advantageous to operate at reduced pressure to permit the use of lower temperatures. Pressures below 200 mm. Hg have been found particularly advantageous.

It has been found to be very advantageous to effect the thermal cleavage while a stream of a gas inert under the conditions of this process is passed through the reaction zone. This will generally result in a considerably increased yield since the gas stream promotes the removal of byproducts at the lowest possible temperature. Nitrogen is a particularly suitable gas, although other gases or gas mixtures such as air, carbon dioxide, helium, neon, methane, ethane, propane, and the like may also be used.

In many cases it has also been found to be very advantageous to carry out the reaction in the presence of a minor, or catalytic amount of an acid. While the acid may amount to 10% or more of the reaction mixture, it is preferred to use from about 1% to about 5% by weight of the acid selected. Any strong acid (pH<5) is suitable for this purpose. Organic acids such as the carboxylic acids and sulfonic acids may be used. Examples of these acids are benzene sulfonic acid, benzoic acid, acetic acid, trichloracetic acid, and the like. Strong mineral acids such as hydrochloric acid, sulfuric acid, and phosphoric acid are very suitable for this purpose. Acidic ion exchange resins are equally suitable and are preferred. Silica gel has been found to be particularly well suited for this purpose.

The reaction is preferably carried out by heating the ether to the cleavage temperature in liquid phase while a stream of inert gas is passed through at reduced pressure, the byproducts distilling off. However, the stream of inert gas is not essential and it is also possible to carry out the process by heating the appropriate ether in vapor phase. If desired, the reaction may be carried out in an inert solvent or diluent. Hydrocarbons such as toluene, benzene, xylene, ethylbenzene, hexane, cyclohexane, heptane, octane, and the like are suitable solvents.

Details of the process of this invention are best illustrated by the following examples. It is to be understood that they are offered for illustration only and are not to be construed as limiting the invention in any way.

Example I

In a distillation apparatus 33.43 g. of ditropyl ether were heated to 115° C.–130° C. for one hour under a vacuum of 120 mm. Hg, 7.74 g. of cycloheptatriene distilling off; $n_D^{20} = 1.5225$. Hence the cycloheptatriene yield was 50%.

The residue was then subjected to a vacuum distillation. 9.25 g. of tropone was obtained boiling at 70° C. at 0.3 mm. Hg; $n_D^{20} = 1.6180$. Hence the tropone yield was 50%.

Example II

In a reaction vessel provided with a distillation head and a gas supply tube, a mixture of 83 g. of ditropyl ether and 5 g. of an acid silica gel was heated under a vacuum of 150 mm. Hg while a nitrogen stream was passed through. (A silica gel washed with a strong mineral acid and dried above sulfuric acid was used.) At a bottom temperature of 65° C. cycloheptatriene began to distill off. The bottom temperature was now raised to 125° C., the pressure decreasing to 20 mm. Hg. 28.5 g. of cycloheptatriene were obtained. Hence the cycloheptatriene yield was 75%.

The residue was subsequently subjected to a distillation. 35 g. of tropone with a boiling point of 70° C. at 0.3 mm. Hg were obtained. Hence the tropone yield was 78%.

We claim as our invention:

1. A process for the production of tropones which comprises thermally cleaving at a temperature of from about 60° C. to about 130° C. a compound represented by the formula:

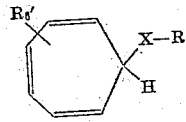

wherein
(a) X is oxygen,
(b) each of the six R' groups is selected from the group consisting of hydrogen, alkyl and aryl radicals with no more than 10 carbon atoms,
(c) R is a monovalent hydrocarbon group with no more than 12 carbon atoms selected from the group consisting of:
(1) the group:

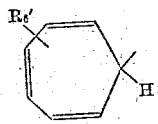

wherein R' is as defined in (b)
(2) alkyl,
(3) aryl,
(4) alkenyl, and
(5) cycloalkyl.

2. A process for the preparation of tropone which comprises heating ditropyl ether at a temperature of from about 60° C. to about 130° C. at a pressure below one atmosphere.

References Cited in the file of this patent

Doering et al.: J. Am. Chem. Soc., vol 79, pages 352–6 (1957).